United States Patent
Asai

(10) Patent No.: US 10,697,402 B2
(45) Date of Patent: Jun. 30, 2020

(54) INTAKE APPARATUS FOR INTERNAL COMBUSTION ENGINE

(71) Applicant: KABUSHIKI KAISHA TOYOTA JIDOSHOKKI, Kariya-shi, Aichi-ken (JP)

(72) Inventor: Mitsuki Asai, Kariya (JP)

(73) Assignee: KABUSHIKI KAISHA TOYOTA JIDOSHOKKI, Kariya-shi, Aichi-ken (JP)

(*) Notice: Subject to any disclaimer, the term of this patent is extended or adjusted under 35 U.S.C. 154(b) by 0 days.

(21) Appl. No.: 16/098,903

(22) PCT Filed: Apr. 14, 2017

(86) PCT No.: PCT/JP2017/015239
§ 371 (c)(1),
(2) Date: Nov. 5, 2018

(87) PCT Pub. No.: WO2017/195525
PCT Pub. Date: Nov. 16, 2017

(65) Prior Publication Data
US 2019/0195174 A1   Jun. 27, 2019

(30) Foreign Application Priority Data

May 12, 2016   (JP) ................. 2016-095899

(51) Int. Cl.
*F02M 35/10*   (2006.01)
*F02M 26/19*   (2016.01)
(Continued)

(52) U.S. Cl.
CPC ............ *F02M 26/19* (2016.02); *F02M 26/44* (2016.02); *F02M 35/10222* (2013.01);
(Continued)

(58) Field of Classification Search
CPC ....... F02M 35/10222; F02M 35/10262; F02M 35/116; F02M 26/20; F02M 26/19; F02M 26/44; F02M 26/17; Y02T 10/146
(Continued)

(56) References Cited

U.S. PATENT DOCUMENTS 6,155,223 A * 12/2000 Miazgowicz ........... F02B 47/08
                                                          123/184.35
9,790,897 B2 * 10/2017 Martins ............ F02M 35/10078
(Continued)

FOREIGN PATENT DOCUMENTS

JP        55-83561 U       6/1980
JP        59-182667 U     12/1984
(Continued)

OTHER PUBLICATIONS

International Preliminary Report on Patentability with the translation of Written Opinion dated Nov. 13, 2018 issued by the International Bureau in PCT/JP2017/015239.
International Search Report for PCT/JP2017/015239 dated Jun. 27, 2017 [PCT/ISA/210].

*Primary Examiner* — Hai H Huynh
*Assistant Examiner* — Gonzalo Laguarda
(74) *Attorney, Agent, or Firm* — Sughrue Mion, PLLC

(57) ABSTRACT

This intake apparatus for an internal combustion engine having a first bank and a second bank includes: an intake pipe including one new-air intake pipe, two branched pipes, and a junction connecting the new-air intake pipe to the two branched pipes; an EGR gas pipe connected to the junction; and a partitioning member placed around an opening in the EGR gas pipe that opens toward the intake pipe. The partitioning member defines an EGR gas storage chamber. The EGR gas storage chamber has first-bank and second-bank flow passages in which the EGR gas flows toward the first bank and the second bank. The first and second effective
(Continued)

cross-sectional areas in the first-bank flow passage and the second-bank flow passage are smaller than the flow passage cross-sectional area in the opening of the EGR gas pipe.

8 Claims, 6 Drawing Sheets

(51) Int. Cl.
 *F02M 35/116* (2006.01)
 *F02M 26/44* (2016.01)
 *F02M 26/20* (2016.01)
(52) U.S. Cl.
 CPC .... *F02M 35/10262* (2013.01); *F02M 35/116* (2013.01); *F02M 26/20* (2016.02); *F02M 2700/126* (2013.01); *F02M 2700/4376* (2013.01); *Y02T 10/146* (2013.01)
(58) Field of Classification Search
 USPC .......................................... 123/568.17, 568.18
 See application file for complete search history.

(56) References Cited

U.S. PATENT DOCUMENTS

| | | | |
|---|---|---|---|
| 10,082,112 B2* | 9/2018 | Nakamura | F02M 26/20 |
| 10,247,089 B1* | 4/2019 | Wicks | F02B 29/0468 |
| 2009/0293829 A1* | 12/2009 | Horie | F02M 35/10085 |
| | | | 123/184.21 |
| 2009/0293831 A1* | 12/2009 | Harada | F02M 35/10085 |
| | | | 123/184.53 |
| 2011/0174279 A1* | 7/2011 | Ito | F02B 31/06 |
| | | | 123/568.18 |
| 2014/0102429 A1* | 4/2014 | Hayman | F02M 35/10222 |
| | | | 123/568.18 |

FOREIGN PATENT DOCUMENTS

| | | |
|---|---|---|
| JP | 60-90552 U | 6/1985 |
| JP | 09-088745 A | 3/1997 |
| JP | 2013-113139 A | 6/2013 |

* cited by examiner

INTAKE APPARATUS FOR INTERNAL COMBUSTION ENGINE

CROSS REFERENCE TO RELATED APPLICATIONS

This application is a National Stage of International Application No. PCT/JP2017/015239 filed Apr. 14, 2017, claiming priority based on Japanese Patent Application No. 2016-095899 filed May 12, 2016, the disclosure of which is incorporated herein in its entirety by reference.

TECHNICAL FIELD

The present invention relates to an intake apparatus for an internal combustion engine.

BACKGROUND ART

In an EGR system of an internal combustion engine, an EGR gas pipe is connected to an intake pipe to recirculate a portion of the exhaust gas to the intake system as EGR gas. Patent document 1 discloses a technique that connects the EGR gas pipe to a branching portion of an intake passage in a multi-cylinder engine and arranges an umbrella-shaped flow deflection means at the branching portion so that the EGR gas flow does not strike the intake air flow head-on.

PRIOR ART LITERATURE

Patent Literature

Patent Document 1: Japanese Laid-Open Patent Publication No. 9-88745

SUMMARY OF THE INVENTION

Problem to be Solved by the Invention

When recirculating EGR gas to the intake system of an internal combustion engine that has two banks, namely, a left bank and a right bank, such as a V-type engine, there is a need to equalize the amount of EGR gas flowing into the each bank in order to reduce differences in the EGR gas ratio between the cylinders.

One object of the present invention is to provide an intake apparatus for an internal combustion engine that equalizes the amount of EGR gas flowing into a first bank and a second bank.

Means for Solving the Problem

An intake apparatus for an internal combustion engine that has a first bank and a second bank and achieves the above object includes an intake pipe including a single fresh air intake pipe portion through which fresh air flows, two branching pipe portions for the first bank and the second bank, and a branching portion that connects the fresh air intake pipe portion to the two branching pipe portions, an EGR gas pipe connected to the branching portion and configured to draw EGR gas into the intake pipe, and a partition wall arranged at a periphery of an opening of the EGR gas pipe that opens in the intake pipe. The partition wall defines an EGR gas accumulation chamber into which EGR gas flows and out of which EGR gas flows toward the first bank and the second bank. The EGR gas accumulation chamber includes a first bank flow passage through which EGR gas flows out toward the first bank, and a second bank flow passage through which EGR gas flows out toward the second bank. A first effective cross-sectional area of the first bank flow passage and a second effective cross-sectional area of the second bank flow passage are smaller than a flow passage cross-sectional area of the EGR gas pipe at the opening.

EMBODIMENTS OF THE INVENTION

The present invention in accordance with one embodiment will now be described with reference to the drawings.

In the present embodiment, to facilitate understanding of the structure, a Cartesian coordinate system of a three dimensional space is defined by an X-axis, a Y-axis, and a Z-axis that are orthogonal to one another.

Figure 1:
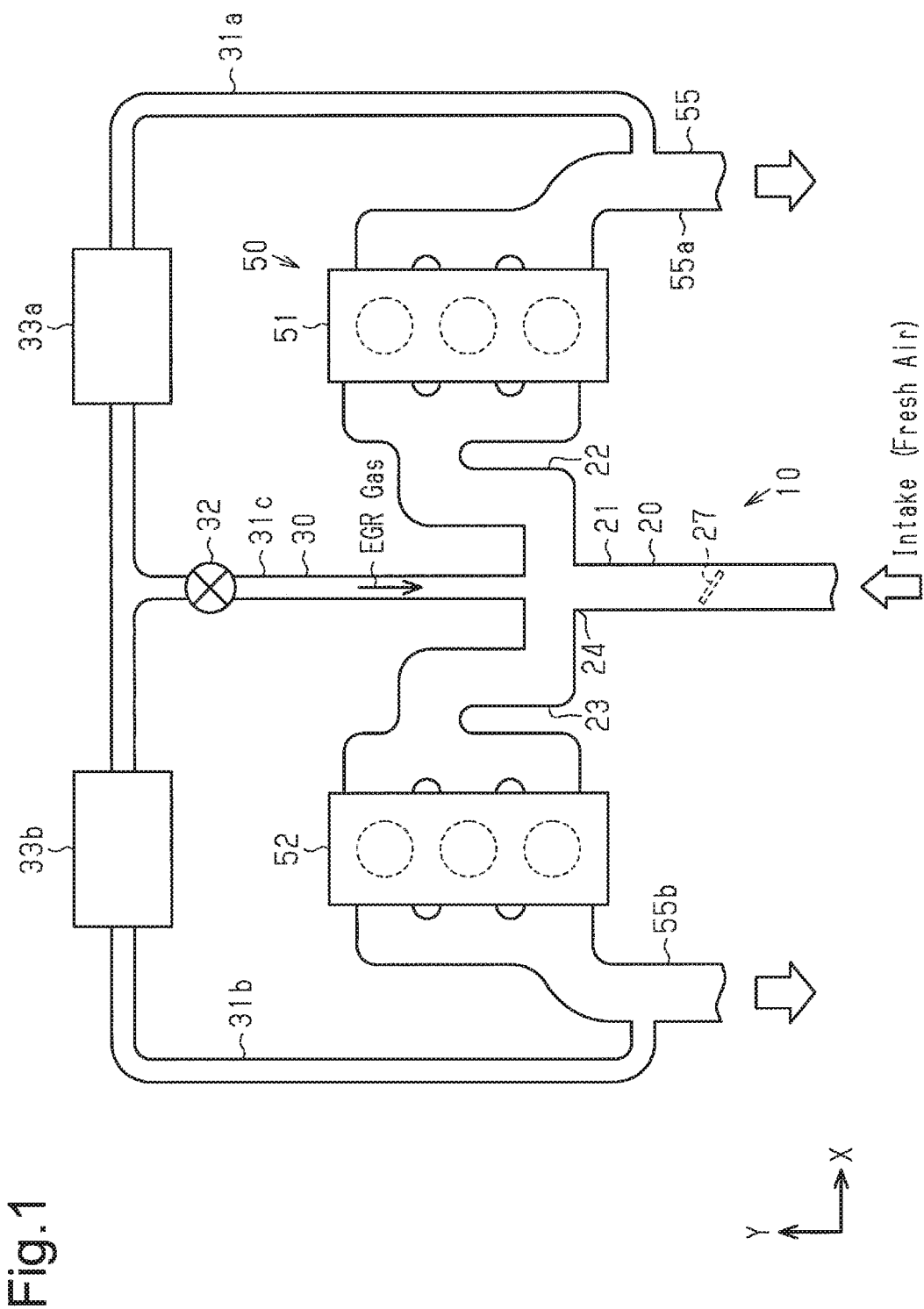
FIG. 1 is a schematic plan view showing one embodiment of an intake apparatus for an internal combustion engine.

As shown in FIG. 1, an intake apparatus 10 for an internal combustion engine 50 includes an intake pipe 20 and an EGR gas pipe 30 that draws EGR gas into the intake pipe 20. The intake pipe 20 includes a single fresh air intake pipe portion 21 through which fresh air flows and two branching pipe portions 22 and 23 that are branched off from the fresh air intake pipe portion 21. The intake pipe 20 further includes a branching portion 24 that connects the fresh air intake pipe portion 21 and the two branching pipe portions 22 and 23.

The internal combustion engine 50 is mounted on a vehicle. The output of the internal combustion engine 50 is transmitted by a transmission to the wheels. In the present embodiment, a V-type diesel engine with six cylinders is used as the internal combustion engine 50. The internal combustion engine 50 includes a right bank 51, which serves as a first bank, and a left bank 52, which serves as a second bank. The right bank 51 and the left bank 52 each include three cylinders.

The internal combustion engine 50 is connected to an exhaust pipe 55 through which the exhaust gas discharged from the internal combustion engine 50 flows. The exhaust pipe 55 includes an exhaust pipe portion for a right bank 55*a* and an exhaust pipe portion for a left bank 55*b*. The exhaust pipe 55 is connected to an EGR gas pipe 30 that returns a portion of the exhaust gas to the intake system. The EGR gas pipe 30 includes an right bank EGR gas pipe portion 31*a*, a left bank EGR gas pipe portion 31*b*, and a merging EGR gas pipe portion 31*c* where the right bank EGR gas pipe portion 31*a* and the left bank EGR gas pipe portion bank 31*b* merge.

Figure 2:
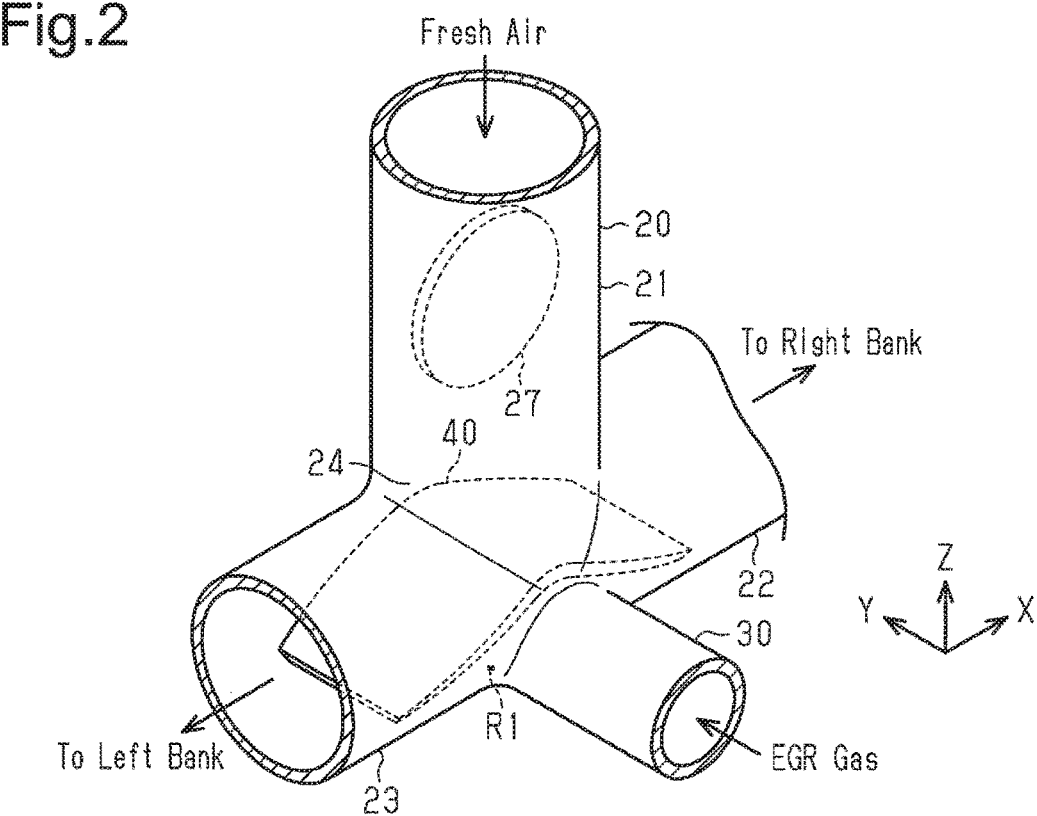
FIG. 2 is a perspective view showing part of the intake apparatus in FIG. 1.
Figure 3:
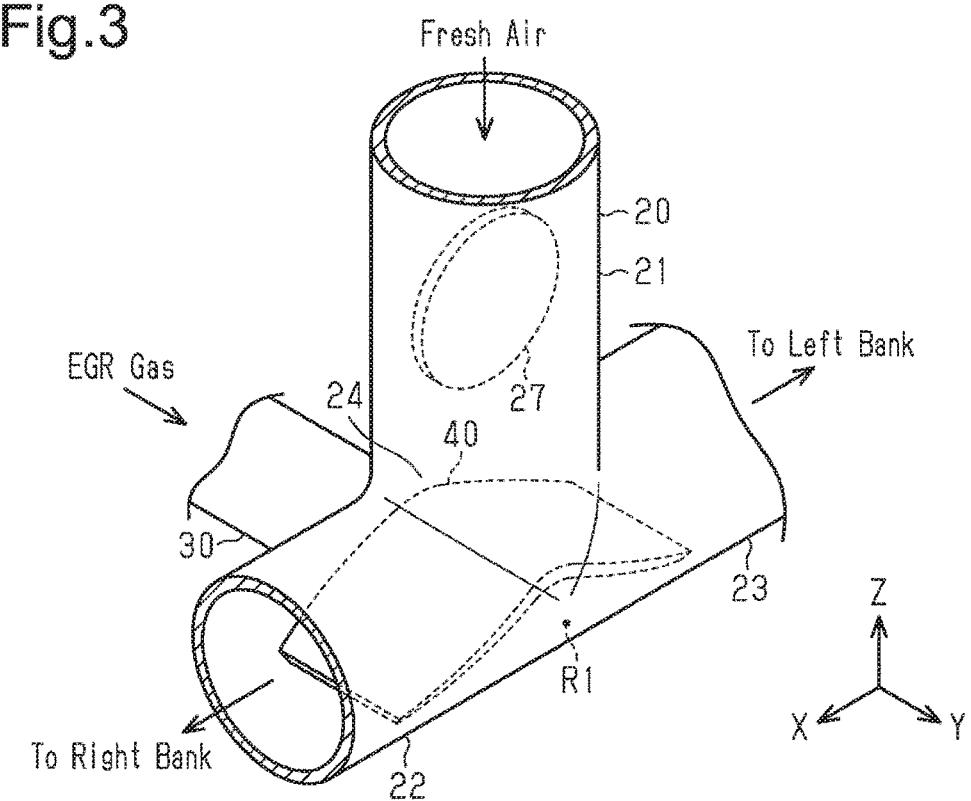
FIG. 3 is a perspective view showing part of the intake apparatus in FIG. 1.

As shown in FIGS. 2 and 3, the branching pipe portions 22 and 23 branch off from the fresh air intake pipe portion 21 at the branching portion 24. The branching pipe portion 22 is for the right bank 51, and the branching pipe portion 23 is for the left bank 52. The fresh air intake pipe portion 21 and the branching pipe portions 22 and 23 are circular pipes.

The fresh air intake pipe portion 21 extends along the Z-axis toward the branching portion 24. The branching pipe portions 22 and 23 each extend from the branching portion 24 along the X-axis away from each other.

A portion of the exhaust gas discharged from the internal combustion engine 50 is returned to the intake system as EGR gas through the EGR gas pipe 30, which is connected to the exhaust pipe 55. The EGR gas pipe 30 is connected to the branching portion 24 of the intake pipe 20.

As shown in FIG. 1, the merging EGR gas pipe portion 31*c* includes an EGR valve 32 that regulates and interrupts the flow of EGR gas toward the intake pipe 20. Further, at an upstream side of the EGR valve 32, the EGR gas pipe 30 includes EGR coolers 33*a* and 33*b* that cool the EGR gas, which is drawn from the exhaust pipe 55. The EGR gas pipe 30 is a circular pipe.

As shown in FIG. 2, the EGR gas pipe 30 extends near the branching portion 24 along the Y-axis. EGR gas is drawn through the EGR gas pipe 30 into the intake pipe 20. When the two banks 51 and 52 draw gas, the EGR gas merges with fresh air that is flowing from the fresh air intake pipe portion 21 into the banks 51 and 52. Further, at an upstream side of the branching portion 24, the fresh air intake pipe portion 21 includes a diesel throttle (valve) 27. Opening and closing control is executed on the diesel throttle 27 to allow a large amount of EGR gas to be drawn from the EGR gas pipe 30 into the intake pipe 20 when the load is small or the like.

The EGR gas pipe 30 is coupled to the intake pipe 20 at a downstream side of the diesel throttle 27. This restricts components such as soot or unburned fuel contained in the EGR gas, which is drawn from the EGR gas pipe 30 into the intake pipe 20, to collect on the diesel throttle 27 and cause an operational failure. The branching portion 24 is formed at a location spaced apart from the diesel throttle 27, and the EGR gas pipe 30 is coupled to the branching portion 24. Further, the EGR gas pipe 30 is coupled to the intake pipe 20 only at the branching portion 24 thereby allowing the EGR gas to merge with fresh air without complicating the structure of the EGR gas pipe. If the EGR gas pipe were to be coupled to the intake pipe 20 at a downstream side of the branching portion 24, the EGR gas pipe would need to be branched when connected to the intake pipe 20 in correspondence with the branching pipe portions 22 and 23. This would complicate the structure of the EGR gas pipe. In the present embodiment, the EGR gas pipe 30 is coupled only at the branching portion 24 to avoid such complication in the structure of the EGR gas pipe.

Figure 4A:
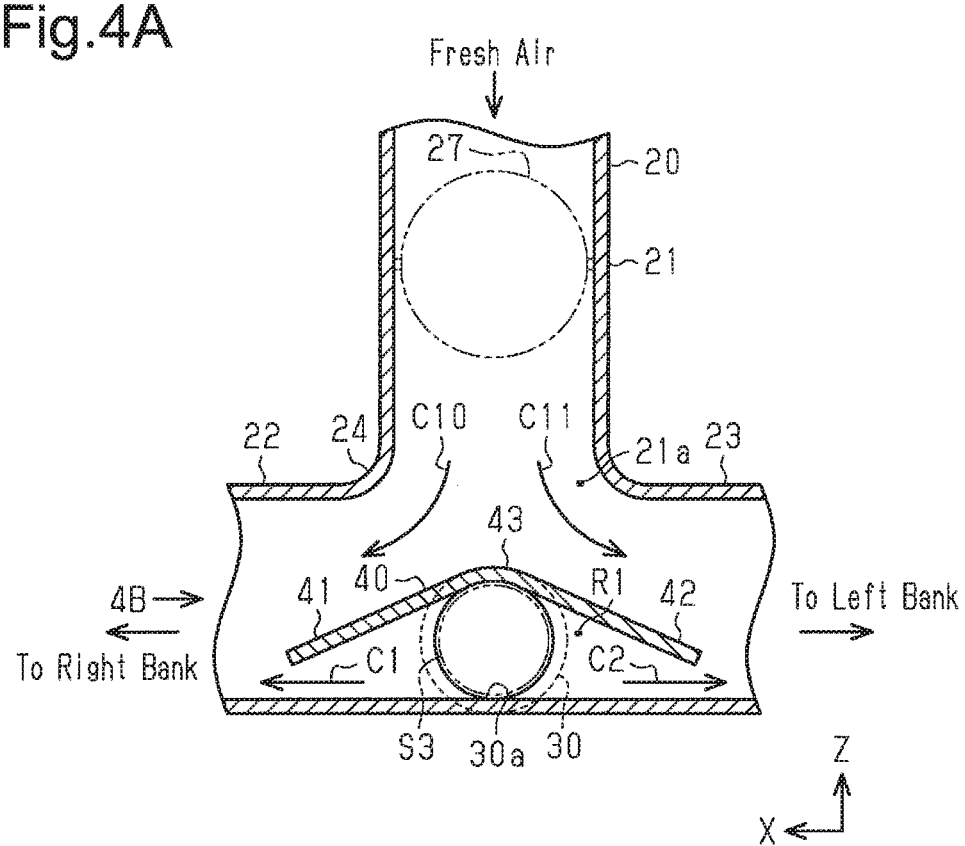
FIG. 4A is a cross-sectional view showing part of the intake apparatus in FIG. 1.

As shown in FIGS. 2, 3, 4A, and 4B, a partition wall 40 is arranged in the intake pipe 20. The partition wall 40 is located between an opening 30*a* of the EGR gas pipe 30 that opens toward the branching portion 24 and an opening 21*a* of the fresh air intake pipe portion 21 that opens toward the branching portion 24. As shown in FIG. 4A, in the branching portion 24, the partition wall 40 includes a peak 43 and slopes 41 and 42. The peak 43 opposes the opening 21*a* of the fresh air intake pipe portion 21. The slopes 41 and 42 extend from the peak 43 away from each other along the branching pipe portions 22 and 23, respectively. More specifically, as shown in FIG. 4A, the slope 41 is formed as a wall that extends from the peak 43, which opposes a central portion of the fresh air intake pipe portion 21, with a downward inclination in a direction in which the branching pipe portion 22 extends. Further, the slope 42 is formed as a wall that extends from the peak 43 with a downward inclination in a direction in which the branching pipe portion 23 extends. In FIG. 4A, an inclination angle of the slope 41 relative to the X-axis is equal to an inclination angle of the slope 42 relative to the X-axis. Further, as shown in FIG. 4A, the peak 43 (coupling part of slope 41 and slope 42) of the partition wall 40 is arcuate and bulged toward the fresh air intake pipe portion 21. The partition wall 40 having the form of a plate checks reversed flow of the EGR gas, which is drawn from the EGR gas pipe 30 into the intake pipe 20, toward the upstream side with respect to the flow of fresh air. That is, the partition wall 40 restricts the flow of EGR gas into the fresh air intake pipe portion 21. Further, the partition wall 40 functions as a baffle plate for the fresh air drawn from the fresh air intake pipe portion 21. More specifically, when fresh air is drawn from the fresh air intake pipe portion 21 into the right bank 51, a flow C10 is formed toward the right bank 51 along the slope 41 of the partition wall 40. In the same manner, when fresh air is drawn from the fresh air intake pipe portion 21 into the left bank 52, a flow C11 is formed toward the left bank 52 along the slope 42 of the partition wall 40. In this way, the partition wall 40 is shaped to bulge toward the opening 21*a* of the fresh air intake pipe portion 21 and function as a baffle plate that smoothly guides the fresh air drawn from the fresh air intake pipe portion 21 to the left and right banks.

At a side of the peak 43 opposite to the side at which the opening 21*a* of fresh air intake pipe portion 21 is located, the EGR gas pipe 30, which extends in the Y direction, is connected to the intake pipe 20 and opens toward the intake pipe 20. Accordingly, as shown in FIG. 4A, a space (space surrounded by partition wall 40 and inner surface of intake pipe 20) having a substantially triangular cross-section is formed in the branching portion 24 of the intake pipe 20 at the side of the partition wall 40 opposite to the side at which the opening 21*a* of the fresh air intake pipe portion 21 is located. The space functions as an EGR gas accumulation chamber R1 that accumulates EGR gas. That is, the partition wall 40 defines the EGR gas accumulation chamber R1 in the intake pipe 20 that accumulates EGR gas. The EGR gas accumulation chamber R1 includes a right bank flow passage C1 that serves as a first bank flow passage and a left bank flow passage C2 that serves as the second bank flow passage. The right bank flow passage C1 and the left bank flow passage C2 extend toward the two branching pipe portions 22 and 23, respectively. The EGR gas flowing from the EGR gas pipe 30 into the EGR gas accumulation chamber R1 and accumulated in the EGR gas accumulation chamber R1 flows out through the right bank flow passage C1 or the left bank flow passage C2 to the two banks 51 and 52. Specifically, the fresh air, which is drawn from the fresh air intake pipe portion 21, and the EGR gas, which is drawn from the EGR gas pipe 30 and accumulated in the EGR gas accumulation chamber R1, flow into the branching pipe portion 22 or 23 in accordance with the intake actions of the right bank 51 and the left bank 52.

In this manner, the partition wall 40 is located at a periphery of the opening 30a of the EGR gas pipe 30, which opens toward the intake pipe 20 (i.e. the partition wall 40 is proximate to the opening 30a of the EGR gas pipe 30, which opens toward the intake pipe 20). The partition wall 40 defines the EGR gas accumulation chamber R1 into which the EGR gas flows and out of which the EGR gas flows toward the right bank 51 and the left bank 52.

The right bank flow passage C1 through which EGR gas flows from the EGR gas accumulation chamber R1 toward the right bank 51 has an effective cross-sectional area that is smaller than a flow passage cross-sectional area S3 of the EGR gas pipe 30 at the opening 30a. Further, the left bank flow passage C2 through which EGR gas flows from the EGR gas accumulation chamber R1 toward the left bank 52 has an effective cross-sectional area that is smaller than the flow passage cross-sectional area S3 of the EGR gas pipe 30 at the opening 30a.

Figure 4B:
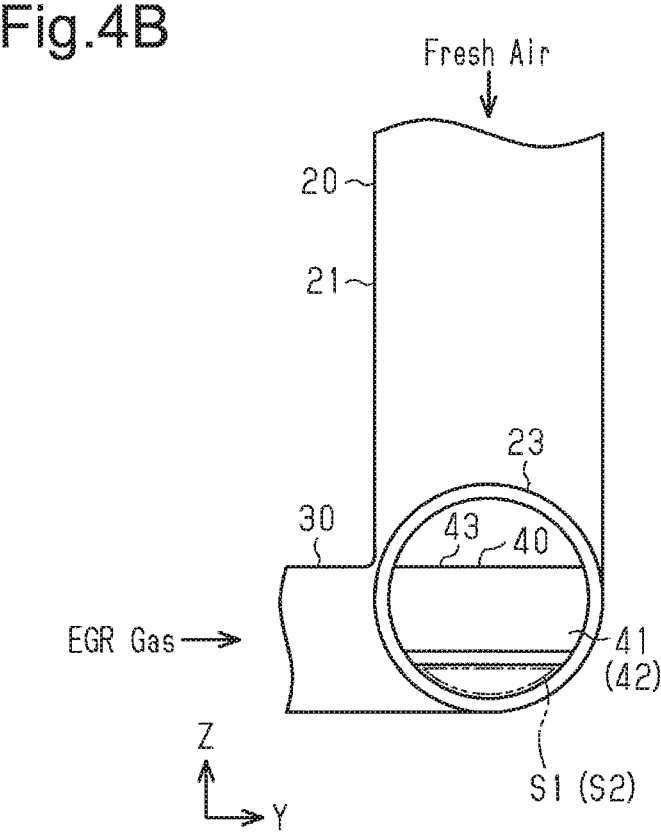
FIG. 4B is a view taken in the direction of arrow 4B in FIG. 4A.

More specifically, as shown in FIGS. 4A and 4B, the actual cross-sectional area S1 of the right bank flow passage C1 and the actual cross-sectional area S2 of the left bank flow passage C2 are smaller than the flow passage cross-sectional area S3 of the EGR gas pipe 30 at the opening 30a. Accordingly, the effective cross-sectional area of the right bank flow passage C1 and the effective cross-sectional area of the left bank flow passage C2 are smaller than the flow passage cross-sectional area S3 of the EGR gas pipe 30 at the opening 30a.

The operation will now be described.

Fresh air is drawn from the fresh air intake pipe portion 21. At the branching portion 24, the EGR gas drawn from the EGR gas pipe 30 and accumulated in the EGR gas accumulation chamber R1 merges with fresh air. The mixture of the fresh air and the EGR gas is supplied through the branching pipe portions 22 and 23 to the two banks 51 and 52.

The partition wall 40 arranged at the branching portion 24 in the intake pipe 20 defines the EGR gas accumulation chamber R1. The actual cross-sectional area S1 of the right bank flow passage C1 and the actual cross-sectional area S2 of the left bank flow passage C2 are set to be smaller than the flow passage cross-sectional area S3 of the EGR gas pipe 30 at the opening 30a. That is, the area of the outflow side is smaller than the area of the inflow side. This allows a predetermined amount of EGR gas to be accumulated in the EGR gas accumulation chamber R1. When drawn into the left bank 52, a certain amount of the EGR gas accumulated in the EGR gas accumulation chamber R1 flows out of the left bank flow passage C2 into the left bank 52 together with the fresh air drawn from the fresh air intake pipe portion 21. When drawn into the right bank 51, a certain amount of the EGR gas accumulated in the EGR gas accumulation chamber R1 flows out of the right bank flow passage C1 into the right bank 51 together with the fresh air drawn through the fresh air intake pipe portion 21. As a result, the EGR gas is evenly distributed to each cylinder in the left and right banks.

In this manner, the EGR ratio (ratio of fresh air to EGR gas) in the left and right banks is equalized such that the six cylinders have the same EGR ratio. More specifically, differences in the EGR ratio between the left and right banks can be reduced under various driving conditions (load conditions) thereby improving the EGR distribution performance. Further, the arrangement of the plate-shaped partition wall 40 reduces the blowback of the EGR gas toward the diesel throttle 27. More specifically, the arrangement of the plate-shaped partition wall 40 restricts the blowback of EGR gas toward the upstream side with respect to the flow of fresh air. Thus, the EGR gas does not reach the diesel throttle 27. This reduces impurities such as soot or unburned fuel that collect on the diesel throttle 27. Consequently, operational failure of the diesel throttle 27 can be averted.

Further, the partition wall 40 is a plate bulged toward the opening 21a of the fresh air intake pipe portion 21 and functions as a baffle plate that smoothly guides fresh air toward the two banks. Specifically, as shown in FIG. 4A, the partition wall 40 guides the fresh air drawn from the fresh air intake pipe portion 21 through the flow passage C10 into the right bank 51 and through the flow passage C11 into the left bank 52. As a result, the fresh air smoothly flows into the left and right banks and reduces pressure loss when drawing fresh air.

Further, the EGR gas pipe 30 is coupled to the intake pipe 20 only at one location and merges EGR gas with fresh air. This reduces cost compared to when the EGR gas pipe is branched and separately connected to the branching pipe portions 22 and 23, which correspond to the two banks of the intake pipe.

In the present embodiment, the partition wall 40, which is arranged at a location where the EGR gas pipe 30 is coupled to the intake pipe 20, defines the EGR gas accumulation chamber R1. The EGR gas flows into the EGR gas accumulation chamber R1 and flows out of the EGR gas accumulation chamber R1 toward the two banks 51 and 52. In this way, the EGR gas is not branched before merging with the fresh air. Instead, the EGR gas merges with the fresh air and is then distributed in the intake pipe 20. This avoids complication in the structure of the EGR gas pipe.

Further, the effective cross-sectional area of the right bank flow passage C1 and the effective cross-sectional area of the left bank flow passage C2 are smaller than the flow passage cross-sectional area S3 of the EGR gas pipe 30 at the opening 30a. Accordingly, although the right bank 51 and the left bank 52 alternately draw in fresh air and EGR gas, the pressure loss at the two sides is the same with respect to the pulsation. Additionally, the EGR gas accumulation chamber R1 accumulates the EGR gas and equalizes the amount of EGR gas flowing into the two banks 51 and 52.

As a result, the amount of EGR gas flowing into the two banks is equalized without complicating the structure of the EGR gas pipe.

The above embodiment has the advantages described below.

(1) The EGR gas pipe 30 is connected to the branching portion 24 of the intake pipe 20 in the intake apparatus 10 of the internal combustion engine. The partition wall 40 is arranged at a periphery of the opening 30a of the EGR gas pipe 30 that opens toward the intake pipe 20. The partition wall 40 defines the EGR gas accumulation chamber R1 into which the EGR gas flows and out of which the EGR gas flows toward the right bank 51 and the left bank 52. The effective cross-sectional area of the right bank flow passage C1 through which the EGR gas flows from the EGR gas accumulation chamber R1 toward the right bank 51 and the effective cross-sectional area of the left bank flow passage C2 through which the EGR gas flows from the EGR gas accumulation chamber R1 toward the left bank 52 are smaller than the flow passage cross-sectional area of the EGR gas pipe 30 at the opening 30a. Thus, the amount of the EGR gas flowing into the right bank and the left bank is equalized.

(2) The effective cross-sectional area of the right bank flow passage C1 and the effective cross-sectional area of the left bank flow passage C2 are smaller than the flow passage cross-sectional area S3 of the EGR gas pipe 30 at the opening 30a. Further, the actual cross-sectional area S1 of the right bank flow passage C1 and the actual cross-sectional area S2 of the left bank flow passage C2 are smaller than the flow passage cross-sectional area S3 of the EGR gas pipe 30 at the opening 30a. Thus, the above embodiment is practical.

(3) The partition wall 40 is shaped to bulge toward the opening 21a of the fresh air intake pipe portion 21. This smoothens the flow of fresh air in the flow passage thereby reducing the resistance of the fresh air flow.

The embodiment described is not limited to the above description and may be embodied in the following forms.

Figure 5:
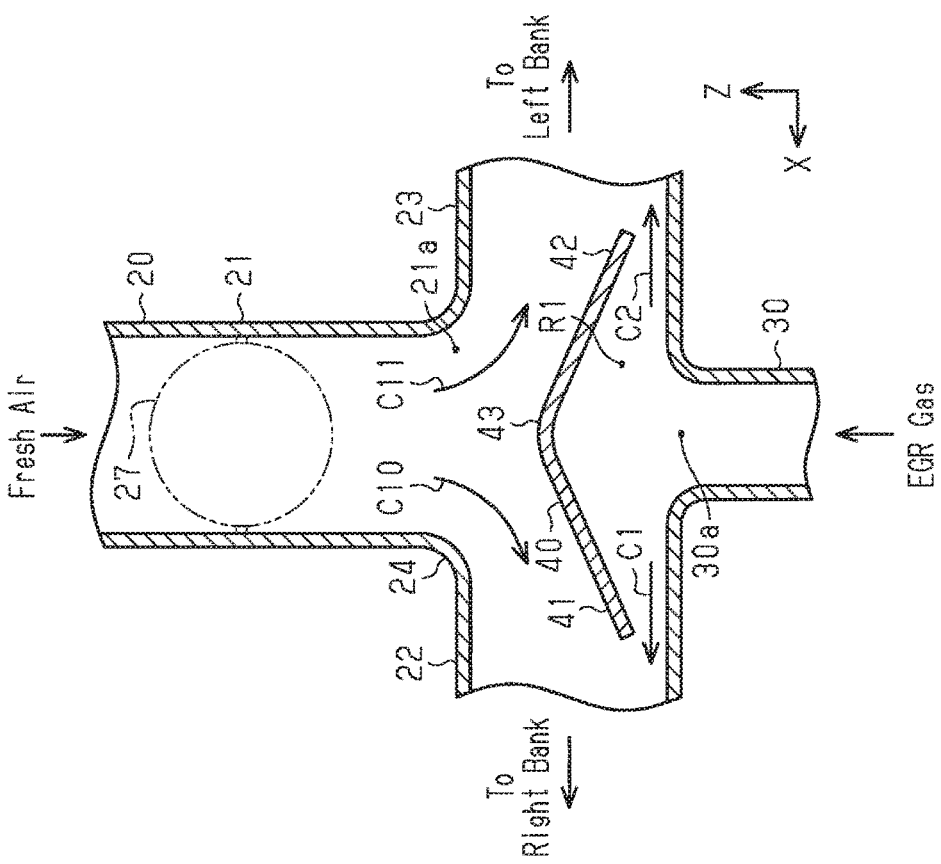
FIG. 5 is a cross-sectional view showing part of an intake apparatus for an internal combustion engine in accordance with another embodiment.

Instead of the intake apparatus shown in FIG. 4A, as shown in FIG. 5, a partition wall 60 configured by a plate may extend straight in the X direction. In this case, the intake pipe 20 includes an arc 61 bulged outward, and the EGR gas pipe 30 opens between the partition wall 60 and the arc 61.

Figure 6:
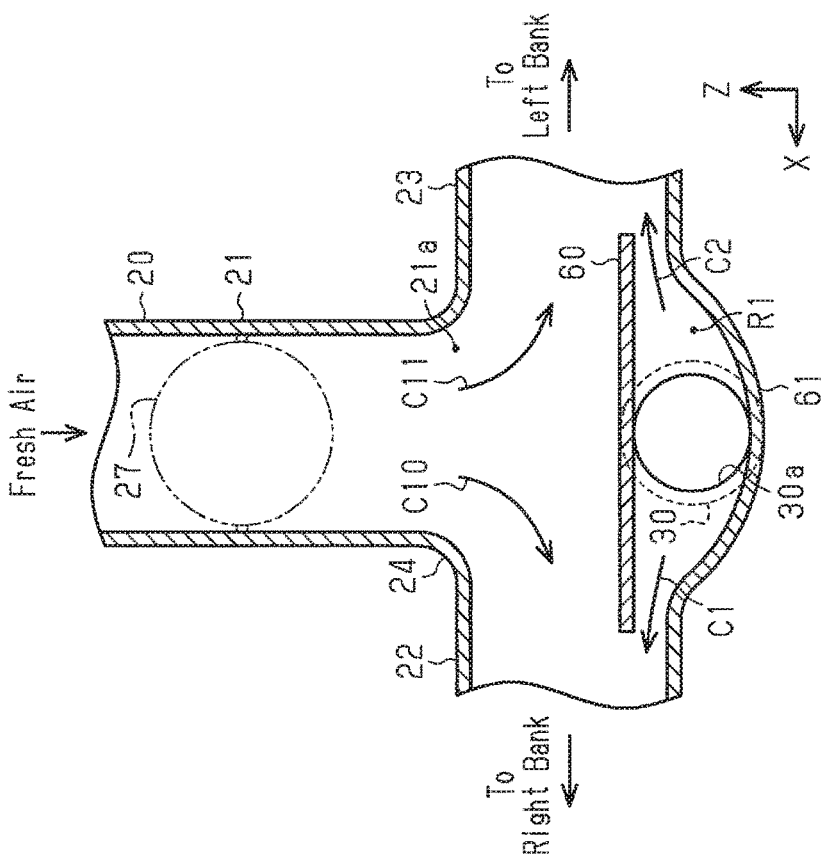
FIG. 6 is a cross-sectional view showing part of an intake apparatus for an internal combustion engine in accordance with a further embodiment.

Instead of the intake apparatus shown in FIG. 4A, as shown in FIG. 6, the EGR gas pipe 30 may extend from the branching portion 24 in the Z direction and draw EGR gas in the Z direction.

Figure 7:
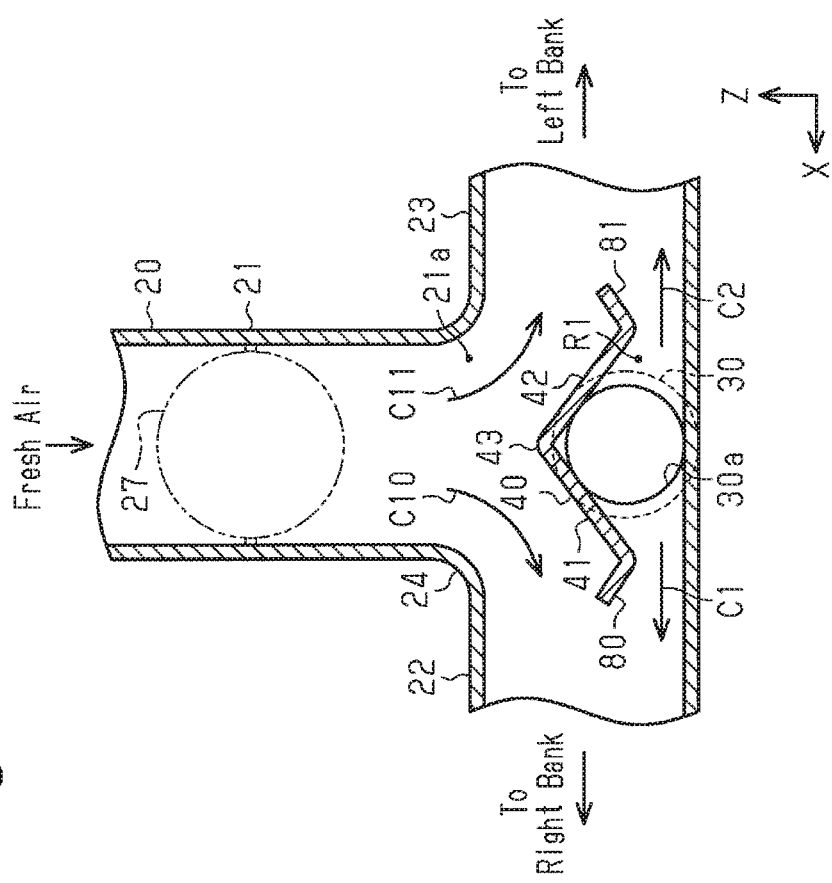
FIG. 7 is a cross-sectional view showing part of an intake apparatus for an internal combustion engine in accordance with a further embodiment.

Instead of the intake apparatus shown in FIG. 4A, as shown in FIG. 7, the fresh air intake pipe portion 21 may be connected to the branching pipe portions 22 and 23 at the branching portion 24 such that the fresh air intake pipe portion 21 and the branching pipe portions 22 and 23 form the shape of an upside-down Y. A partition wall 70 may be arranged in the branching portion 24 in conformance with the shape. It is only required that the partition wall 70 be arranged in the branching portion 24 in conformance with the shape of the pipes at the branching portion 24.

Figure 8:
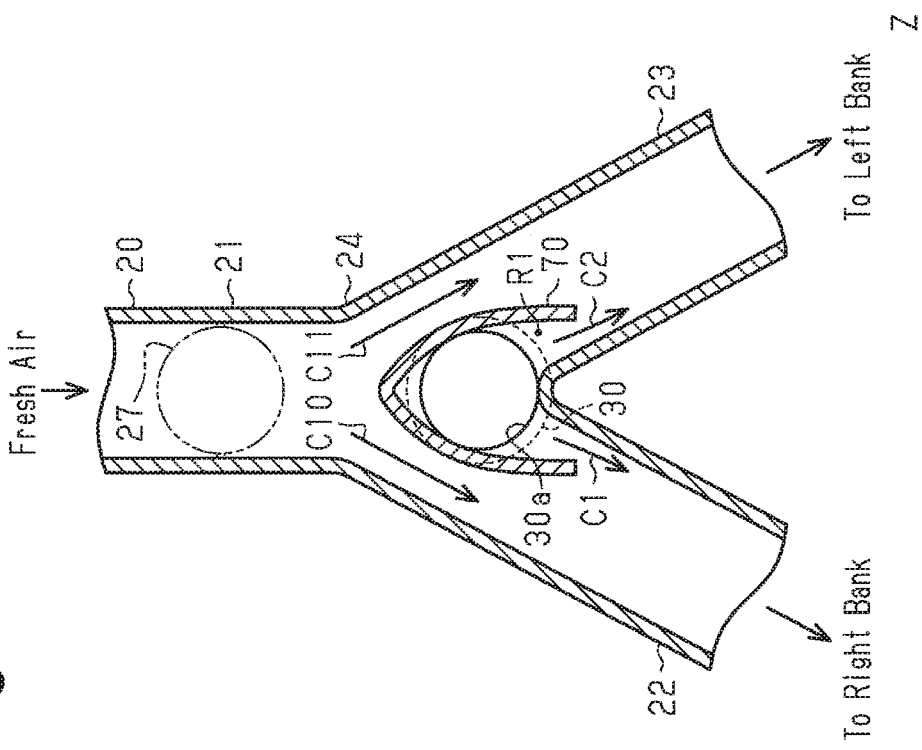
FIG. 8 is a cross-sectional view showing part of an intake apparatus for an internal combustion engine in accordance with a further embodiment.

Instead of the intake apparatus shown in FIG. 4A, as shown in FIG. 8, the partition wall 40 may include a bent portion 80 at a distal end of the slope 41 and a bent portion 81 at a distal end of the slope 42. In this case, the flow passages are the smallest at locations corresponding to the boundary of the slope 41 and the bent portion 80 and the boundary of the slope 42 and the bent portion 81.

Figure 9A:
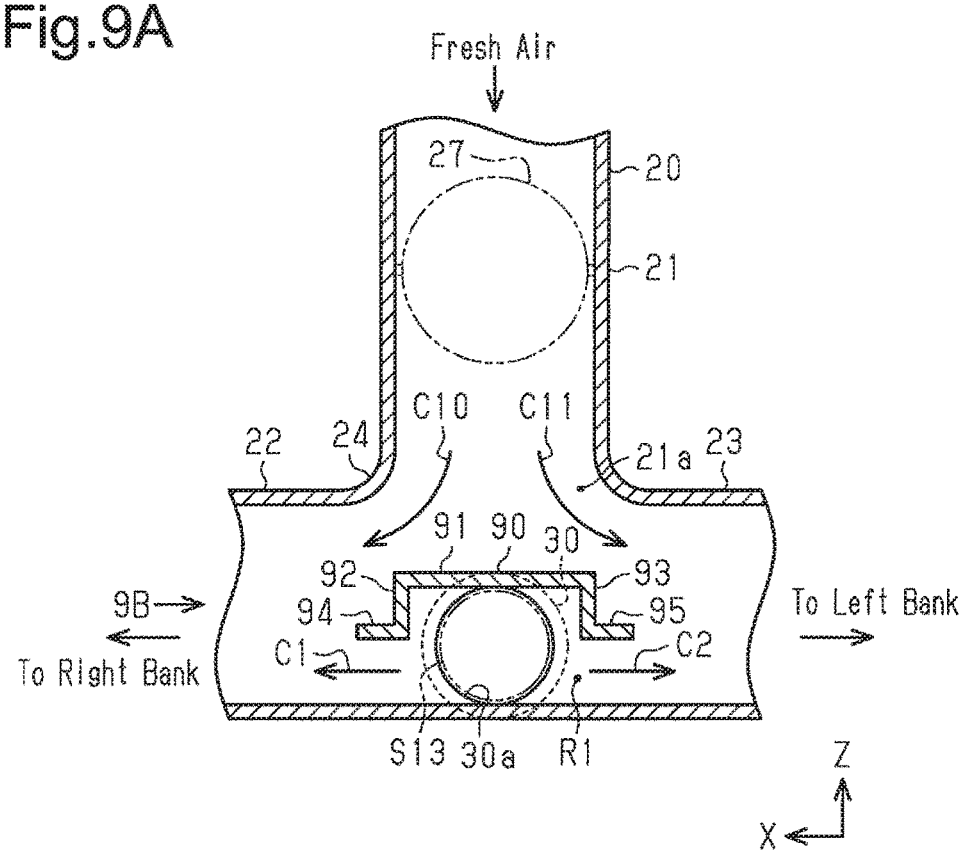
FIG. 9A is a cross-sectional view showing part of an intake apparatus for an internal combustion engine in accordance with further embodiment.
Figure 9B:
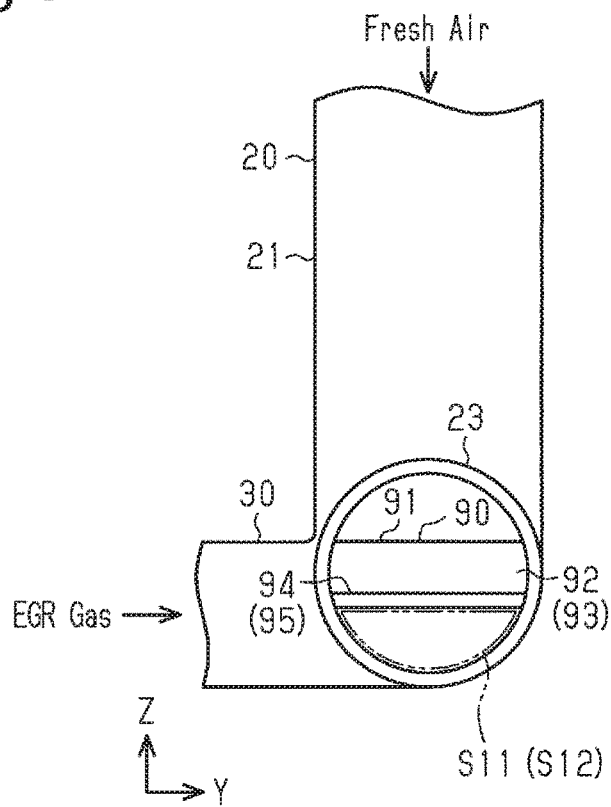
FIG. 9B is a view taken in the direction of arrow 9B in FIG. 9A.

Instead of the intake apparatus shown in FIGS. 4A and 4B, the intake apparatus may be configured as shown in FIGS. 9A and 9B. The effective cross-sectional area is obtained by multiplying a flow factor to the actual cross-sectional area, that is, effective cross-sectional area=(flow factor)×(actual cross-Sectional area). Thus, part of the intake apparatus may be constructed as described below. The actual cross-sectional area may be referred to as an actual flow passage cross-sectional area.

The right bank flow passage C1 has an actual cross-sectional area S11 that is larger than a flow passage cross-sectional area S13 of the EGR gas pipe 30 at the opening 30a. The left bank flow passage C2 has an actual cross-sectional area S12 that is larger than the flow passage cross-sectional area S13 of the EGR gas pipe 30 at the opening 30a. Further, in the EGR gas flow passages C1 and C2 formed in the EGR gas accumulation chamber R1, perpendicular plate portions 92 and 93 are arranged as restrictors that sharply reduce the cross-sectional area of the flow passages in order to decrease the flow factor. More specifically, a partition wall 90 includes a level plate portion 91 that extends in the X direction, the perpendicular plate portions 92 and 93, and level plate portions 94 and 95. The perpendicular plate portions 92 and 93 extend in the Z direction from the two ends of the level plate portion 91 as restrictors. The level plate portions 94 and 95 extend in the X direction from distal ends of the perpendicular plate portions 92 and 93 (restrictors), respectively. Accordingly, the perpendicular plate portions 92 and 93 (restrictors) reduce the effective cross-sectional area of the right bank flow passage C1 and the effective cross-sectional area of the left bank flow passage C2 to be smaller than the flow passage cross-sectional area of the EGR gas pipe 30 at the opening 30a.

The internal combustion engine does not necessarily have to be a V-type engine, and may be an engine that branches into a first bank and a second bank such as a boxer engine or a W-type engine.

The branching portion 24 shown in FIG. 4A including the partition wall 40 does not necessarily have to be symmetrically shaped to be advantageous in respect to the distribution of the EGR gas.

The partition wall 40 does not necessarily have to be configured by a plate.

The EGR gas pipe 30 may be diagonally coupled to the fresh air intake pipe portion 21 instead of being coupled perpendicular to the fresh air intake pipe.

The internal combustion engine does not necessarily have to be a diesel engine, and may be, for example, a gasoline engine. Further, the internal combustion chamber may have any number of cylinders.

The invention claimed is:

1. An intake apparatus for an internal combustion engine that includes a first bank and a second bank, the intake apparatus comprising:
    an intake pipe including a single fresh air intake pipe portion through which fresh air flows, two branching pipe portions for the first bank and the second bank, and a branching portion that connects the fresh air intake pipe portion to the two branching pipe portions;
    an EGR gas pipe connected to the branching portion and configured to draw EGR gas into the intake pipe; and
    a partition wall arranged at a periphery of an opening of the EGR gas pipe that opens in the intake pipe, wherein
    the partition wall defines an EGR gas accumulation chamber into which EGR gas flows and out of which EGR gas flows toward the first bank and the second bank, and
    the EGR gas accumulation chamber includes
        a first bank flow passage through which EGR gas flows out toward the first bank, and
        a second bank flow passage through which EGR gas flows out toward the second bank,
            wherein a first effective cross-sectional area of the first bank flow passage and a second effective cross-sectional area of the second bank flow passage are smaller than a flow passage cross-sectional area of the EGR gas pipe at the opening,
            the first effective cross-sectional area of the first bank flow passage is tapered as it extends from the EGR gas pipe at the opening towards the first branching pipe portion, and
            the second effective cross-sectional area of the second bank flow passage is tapered as it extends from the EGR gas pipe at the opening towards the second branching pipe portion.

2. The intake apparatus according to claim 1, wherein an actual cross-sectional area of the first bank flow passage and an actual cross-sectional area of the second bank flow passage are smaller than the flow passage cross-sectional area of the EGR gas pipe at the opening so that the first effective cross-sectional area and the second effective cross-sectional area are smaller than the flow passage cross-sectional area of the EGR gas pipe at the opening.

3. The intake apparatus according to claim 1, wherein in order for the first effective cross-sectional area and the second effective cross-sectional area to be smaller than the flow passage cross-sectional area of the EGR gas pipe at the opening,
an actual cross-sectional area of the first bank flow passage and an actual cross-sectional area of the second bank flow passage are larger than the flow passage cross-sectional area of the EGR gas pipe at the opening, and
a restrictor is arranged in the first bank flow passage and the second bank flow passage.

4. The intake apparatus according to claim 1, wherein the partition wall is shaped to bulge toward an opening of the fresh air intake pipe portion that opens toward the branching portion.

5. The intake apparatus according to claim 1, wherein the partition wall is opposed to an opening of the fresh air intake pipe portion that opens toward the branching portion and extends from the branching portion toward the two branching pipe portions.

6. The intake apparatus according to claim 1, wherein the partition wall is located between the opening of the EGR gas pipe and an opening of the fresh air intake pipe portion that opens toward the branching portion.

7. The intake apparatus according to claim 1, wherein the branching portion to which the EGR gas pipe is connected is fork-shaped.

8. An intake apparatus for an internal combustion engine that includes a first bank and a second bank, the intake apparatus comprising:
an intake pipe including a single fresh air intake pipe portion through which fresh air flows, two branching pipe portions for the first bank and the second bank, and a branching portion that connects the fresh air intake pipe portion to the two branching pipe portions;
an EGR gas pipe connected to the branching portion and configured to draw EGR gas into the intake pipe; and
a partition wall arranged at a periphery of an opening of the EGR gas pipe that opens in the intake pipe, wherein
the partition wall defines an EGR gas accumulation chamber into which EGR gas flows and out of which EGR gas flows toward the first bank and the second bank, and
the EGR gas accumulation chamber includes
a first bank flow passage through which EGR gas flows out toward the first bank, and
a second bank flow passage through which EGR gas flows out toward the second bank,
wherein a first effective cross-sectional area of the first bank flow passage and a second effective cross-sectional area of the second bank flow passage are smaller than a flow passage cross-sectional area of the EGR gas pipe at the opening,
wherein in order for the first effective cross-sectional area and the second effective cross-sectional area to be smaller than the flow passage cross-sectional area of the EGR gas pipe at the opening,
an actual cross-sectional area of the first bank flow passage and an actual cross-sectional area of the second bank flow passage are larger than the flow passage cross-sectional area of the EGR gas pipe at the opening, and
a restrictor is arranged in the first bank flow passage and the second bank flow passage.

* * * * *